United States Patent [19]

Gray et al.

[11] Patent Number: 4,484,031

[45] Date of Patent: Nov. 20, 1984

[54] INTERFACE CIRCUIT FOR A TELEPHONE SYSTEM

[75] Inventors: Jerry B. Gray, Richardson; Cuba M. Adams, Irving; Larry B. Christensen, Garland, all of Tex.

[73] Assignee: Zale Corporation, Dallas, Tex.

[21] Appl. No.: 390,536

[22] Filed: Jun. 21, 1982

[51] Int. Cl.³ .......................... H04M 3/54; H04Q 3/64
[52] U.S. Cl. ............................. 179/18 BE; 179/27 D
[58] Field of Search ........ 179/18 BE, 27 FH, 27 FG, 179/27 D

[56] References Cited

U.S. PATENT DOCUMENTS

| | | | |
|---|---|---|---|
| 3,614,328 | 10/1971 | McNaughton et al. | 179/18 BE X |
| 3,963,875 | 6/1976 | Gueldenpfennig | 179/27 CA |
| 4,256,928 | 3/1981 | Lesea et al. | 179/18 BE |
| 4,289,934 | 9/1981 | Pitroda et al. | 179/27 D |
| 4,400,587 | 8/1983 | Taylor et al. | 179/27 D |
| 4,408,100 | 10/1983 | Pritz et al. | 179/27 D |

OTHER PUBLICATIONS

"Automatic Call Diversion Option for Hasler SKW 10000/10000 PABXs", D. Eglo and H. R. Hofmann, *Hasler Rev.*, vol. 13, No. 3/4, (Winter 1980), pp. 63–67.

*Primary Examiner*—Thomas W. Brown
*Attorney, Agent, or Firm*—Jerry W. Mills; Gregory M. Howison; Nina Medlock

[57] ABSTRACT

A telephone communication system (10) utilizes a computer controlled PABX (12) which connects telephone trunk lines (13) to a voice response computer (50). The PABX (12) includes an automatic call distribution unit (12a) which provides selected call control and monitoring features. The ACD unit (12a), however, works only into digital control telephone lines while the voice response computer (50) works only with conventional two-wire telephone lines. Incoming telephone calls are transmitted through the trunk lines (13) to the automatic call distribution unit (12a). These calls are routed through a digital control telephone line (18) to a telephone set (24). A register (34) together with a make busy circuit (38) operate the telephone set (24) when one of the telephone lines (40) is available. If one of the lines (40) is available, a call from the PABX (12) through line (18) is received by the telephone set (24), transferred to the PABX (12), an auto-dial is generated by the set (24) and the transfer is completed. The incoming call is transferred to one of the lines (40) which is compatible with the inputs to the voice response computer (50). The register (34) serves to control each of the functions of the telephone set (24) in receiving, transferring, dialing and completing transfer of the incoming calls.

13 Claims, 4 Drawing Figures

INTERFACE CIRCUIT FOR A TELEPHONE SYSTEM

TECHNICAL FIELD

The present invention pertains to telephone communications and more particularly to utilization of a multifunction digital control telephone set.

BACKGROUND OF THE INVENTION

Computer controlled private automatic branch exchange (PABX) telephone systems are coming into greater use in commercial organizations. These systems provide enhanced flexibility in telephone communications and can provide a reduction in the cost of operating a telephone system. The computerized PABX can also be connected to other specialized computer systems for providing a customer services, such as credit verification.

The use of a computer to operate the PABX enables the user to provide automatic call distribution to a selected group of lines, place incoming calls in a hold status to receive a recorded message when no internal lines are available and to collect statistics on the number of calls, response and utilization of the telephone system. However, systems of this type frequently are designed to operate with unique digitally controlled telephone sets which are not compatible with the conventional two-wire telephone format. User equipment, such as a credit verification computer, on the other hand is most often designed to operate with the conventional two-wire telephone format. Therefore, in order to utilize the optimum equipment and features available, there exists a need to provide an interface between such incompatible systems. In particular, there exists a need to interface a digitally controlled telephone network, which operates in conjunction with a computerized PABX, to a conventional two-wire voice response computer to take advantage of the many features available through using the computer PABX.

SUMMARY OF THE INVENTION

A selected embodiment of the present invention comprises a method for routing a telephone call received from trunk lines at a PABX through a plurality of two-wire telephone lines to a user device wherein the PABX has an automatic call distribution subsystem which works in conjunction with a plurality of digital control telephone lines. The method includes the steps of passing a telephone call from one of the trunk lines through a selected one of the digital control telephone lines to a telephone instrument. The two-wire lines to the user device are monitored to detect if at least one of the two-wire lines is not in use. If one of the two-wire lines is not in use, a call transfer command is passed from the telephone instrument to the PABX after receipt of the telephone call by the telephone instrument. Further, the telephone call is transferred from the selected digital control telephone line to an available one of the two-wire lines for connecting the telephone call to the user device.

BRIEF DESCRIPTION OF THE DRAWINGS

For a more complete understanding of the present invention and the advantages thereof, reference is now made to the following description taken in conjunction with the accompanying Drawings in which:

FIG. 4 is an illustration of a timing sequence showing the operation of the relays illustrated in FIGS. 2 and 3.

DETAILED DESCRIPTION OF THE INVENTION

Figure 1:
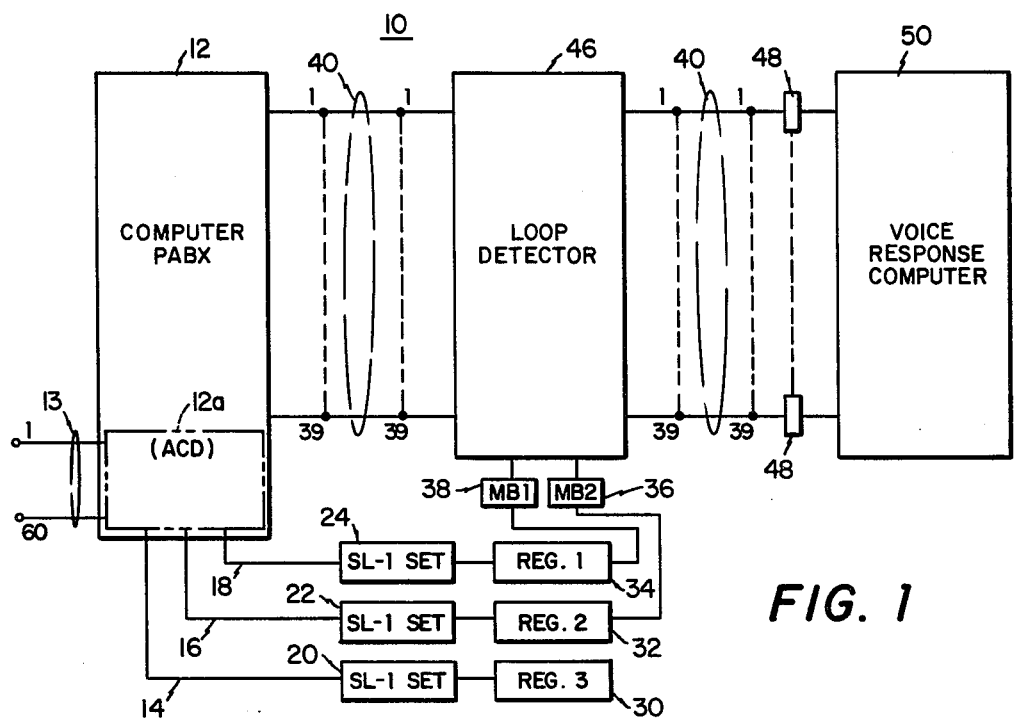
FIG. 1 is a block diagram of a computer PABX which is interfaced to a voice response computer by means of the interface circuit of the present invention.

Referring now to FIG. 1 there is illustrated a block diagram of a communication system 10 which includes a private branch exchange (PBX), which in the preferred embodiment comprises a computer PABX 12. A selected embodiment of the PABX 12 is a model SL-1 EPABX manufactured by Northern Telecom, Inc. The SL-1 system includes an automatic call distribution (ACD) unit 12a which is connected to a group of commercial trunk telephone lines 13, sixty lines being illustrated for the present embodiment. The ACD unit 12a provides numerous functions including automatically switching incoming calls to available internal lines. The ACD unit also measures the number, duration and delay response for calls received through the trunk lines. When no internal lines are available the ACD 12a routes incoming calls to a voice announce trunk which provides a tape recorded response requesting that the caller wait for an available line.

The desired functions of the ACD unit 12a are available so long as the incoming calls are switched through a group of digital control telephone lines, 14, 16 and 18. Each of these lines works into an SL-1 telephone set, also manufactured by Northern Telecom, Inc. This telephone set is preferably a model II, part number QSU60AQM.

Telephone lines 14, 16 and 18 are connected respectively to telephone sets 20, 22 and 24. The sets 20, 22 and 24 are connected respectively to registers 30, 32 and 34. The registers 32 and 34 are connected respectively to make busy circuits 36 and 38. The registers and make busy circuits are further described in reference to FIGS. 2 and 3.

The PABX 12 includes a group of conventional two-wire telephone lines 40. In the system 10 there are shown 39 of these lines. The telephone lines 40 are connected through a loop detector 46 which monitors each of the telephone lines to determine if the line is in use. A selected loop detector is a model SLA5912 manufactured by Teltrend, Inc.

Following the loop detector 46 each of the telephone lines 40 is input to a data coupler shown by the reference numeral 48. A selected data coupler is a model 1001D manufactured by Elgen, Inc.

The outputs from each of the data couplers 48 is provided to a voice response computer 50 such as manufactured by Periphonics, Inc. The data couplers 48 serve to detect an incoming telephone call through the lines 40, answer the incoming call and provide the appropriate connections to the computer 50.

The operation of the communication system 10 is now described in reference to FIG. 1. The automatic call distribution unit 12a receives the incoming calls from the trunk lines 13 and routes these calls to the digital control telephone lines 14, 16 and 18. The automatic features of the unit 12a, including voice announce trunk and statistical data collection, are provided only for those calls routed through the digital control lines 14, 16 and 18. The PABX 12 also includes connections to the conventional two-wire lines 40 but these cannot be used with the added features provided by the ACD 12a. However, only the lines 40 are compatible for direct connection with the voice response computer 50.

The following method has been developed in accordance with the present invention to make optimum use of the ACD unit 12a for providing communication through the lines 40 between the PABX 12 and the computer 50. Each of the incoming calls on the trunk lines 13 is routed by the ACD unit 12a to an available one of the telephone sets 22 and 24. These sets can be grouped according to the particular incoming telephone number to provide different responses, such as credit verification and customer service. If both of the telephone sets 22 and 24 are set to respond to a selected incoming number and are simultaneously in use, the ACD unit 12a routes the incoming call to the voice announce trunk which plays a recording that requests the caller to wait until a line is available. If one of the telephone sets is available when the incoming call is received, the call is routed to a telephone set, such as set 22. The appropriate digital commands are sent from the ACD unit 12a through line 16 to set 22.

The make busy circuit 36 monitors the loop detector 46 to determine if there is at least one line available within the lines 40. This determination is passed through the register 32 to the set 22. If such a line is available the set 22 answers the call from the ACD unit 12a and in a selected time sequence carries out the following functions. The set 22, operating in response to the register 32, provides a transfer command which is transmitted through line 16 to the computer PABX 12 requesting that the call provided to set 22 be transferred to one of the lines 40. A requested transfer number is sent following the transfer command. This number has previously been stored in the set 22 and is generated by an auto-dial command that is input to the telephone set 22 by the register 32. This number, an address signal, is received by the PABX 12 and the incoming trunk call is then connected to an available one of the lines 40. A transfer complete command is then sent by the set 22, in response to the register 32, to disconnect the line 16 from the previously connected trunk line. The call is then placed through one of the lines 40 to a data coupler 48 which responds and connects the voice response computer 50 to one of the lines 40, thus completing the telephone call from one of the trunk lines 13 to the computer 50. The incoming call has been routed through the ACD unit 12a to the computer 50 by use of at least one of the digital control telephone lines 14, 16 and 18 and corresponding telephone set so that the full capabilities of the ACD unit 12a can be utilized.

Figure 2:
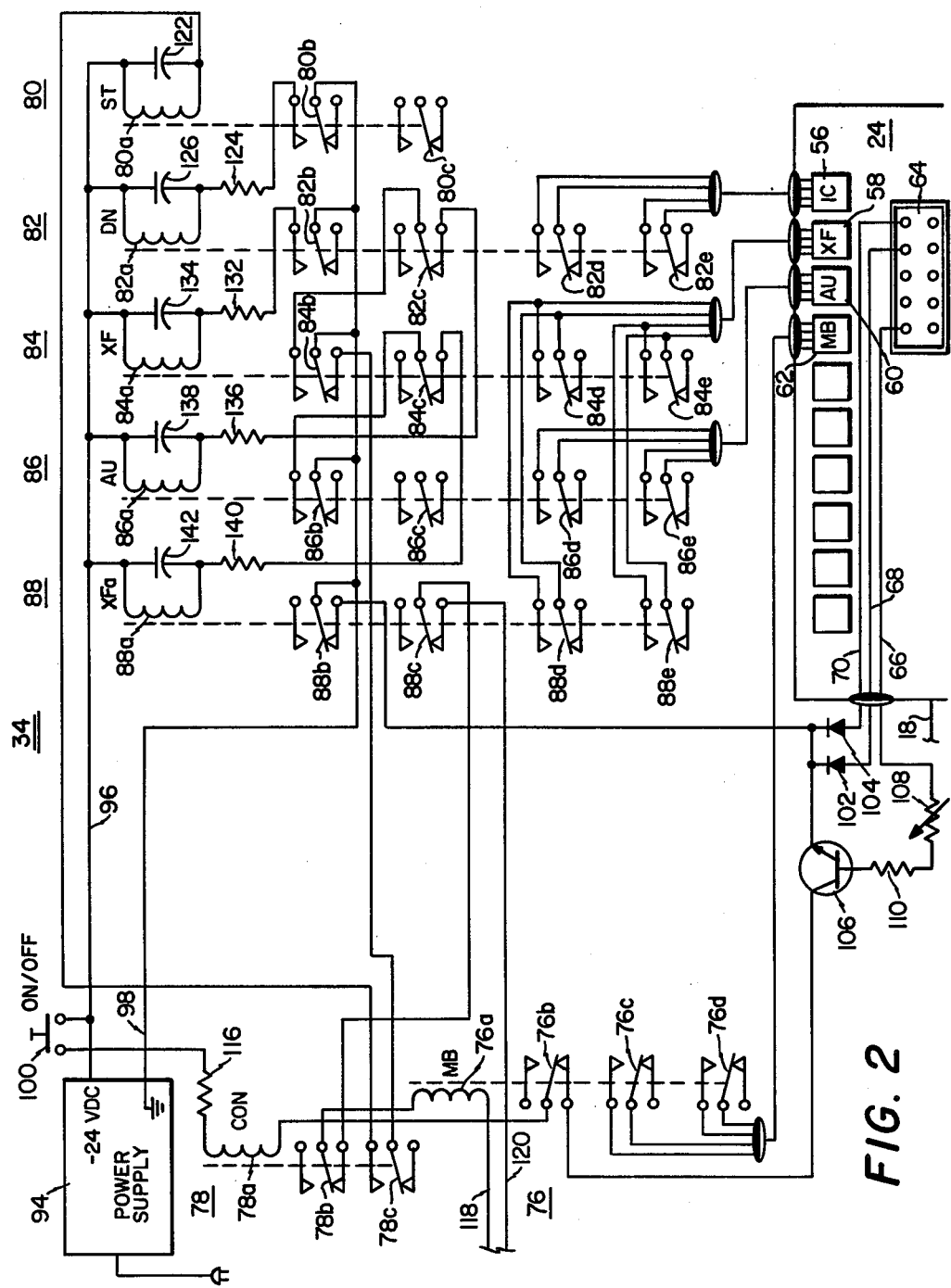
FIG. 2 is a schematic illustration of a single line register in accordance with the present invention.

Refer now to FIG. 2 which has a detailed schematic diagram of the register 34 shown in FIG. 1. The register 34 operates in conjunction with the telephone set 24. Set 24 includes a plurality of function keys including an in-call (IC) key 56, a transfer (XF) key 58, and an auto-dial (AU) key 60 and a make set busy (MB) key 62. The set 24 transmits and receives digital words through the line 18 which is connected to the PABX 12. The line 18 is in fact four separate lines, two lines for analog voice and two lines for digital commands. Each of the function keys is lighted when a command is received for that particular key. The lighting of the function keys is provided by an LED driver 64 which provides output lines including a line 66 which is a common, line 68 which is connected to light the MB key and a line 70 which is connected to light the IC key. Each of the function keys 56, 58, 60 and 62 includes a relay which is activated when the key is depressed. The activation of a key relay generates a corresponding command for that key and the command is transmitted through line 18 to the PABX 12.

The register 34 includes a plurality of relays. A make busy relay 76 includes a coil 76a together with armatures 76b, 76c and 76d.

A control relay 78 includes a coil 78a and armatures 78b and 78c. A start relay 80 includes a coil 80a and armatures 80b and 80c. An answer relay 82 includes a coil 82a and armatures 82b, 82c, 82d and 82e. A transfer relay 84 includes a coil 84a and armatures 84b, 84c, 84d and 84e. An auto-dial relay 86 includes a coil 86a and armatures 86b, 86c, 86d and 86e. A transfer complete relay 88 includes a coil 88a and armatures 88b, 88c, 88d and 88e.

A power supply 94 provides a minus 24 volts DC through a line 96. The circuit ground connection is provided through a line 98. An on/off switch 100 has a first terminal connected to line 96.

The lines 68 and 70 from the LED driver 64 are connected respectively to the anode terminals of diodes 102 and 104. The cathode terminals of the diodes 102 and 104 are connected to the emitter terminal of an NPN transistor 106. A potentiometer 108 and a resistor 110 are connected serially between line 66 and the base terminal of transistor 106. The collector terminal of transistor 106 is connected to the normally closed contact of armature 76b.

The armature 76b is connected to a first terminal of coil 78a. The second terminal of coil 78a is connected through a resistor 116 to the second terminal of switch 100. When either the IC or MB lines 68 or 70 from the LED driver 64 are activated, the transistor 106 is rendered conductive, thereby providing a conductive path through the coil 78a. This serves to activate the relay 78 to move the armatures 78b and 78c to the normally open contacts.

The armatures 76c and 76d have the armatures, together with the normally open contacts of the armatures, connected to the four terminals of the relay for the MB function key 62. Thus, activation of relay 76 serves the same function as depressing the MB key 62.

The armatures 82d and 82e and the corresponding normally closed contacts are connected to the relay terminals of the IC key 56. The armatures 84d and 84e and the normally open contacts associated with them are connected to the terminals of the relay for the XF key 58. The armatures 88d and 88e and the normally open contacts associated with them are connected in parallel with the armatures 84d and 84e and the associated normally closed contacts and the two sets of armatures are connected to the XF key 58. The armatures 86d and 86e and their associated normally closed contacts are connected to the four terminals of the relay for the AU key 60.

The make of relay 76 serves the same function as depressing the MB key 62. Likewise the relays 82, 84 and 86 function the same as depressing respectively the keys 56, 58 and 60. Relay 88 also serves to activate key 58.

The armature 78b is connected to a first terminal of the coil 76a. A second terminal of coil 76a is connected to a line 118. A line 120 is connected to the normally closed contact of armature 88c. The armature 88c is connected to the normally closed contact of armature 78b.

The armature 78c is connected to the normally closed contact of armature 84b which is in turn connected to the ground line 98. The normally open contact of armature 78c is connected through a line to a first terminal of coil 80a. The second terminal of coil 80a is connected to the power line 96. A capacitor 122 is connected in parallel with the coil 80a. The armature 80b is connected to the ground line 98 and the normally open contact of armature 80b is connected through a resistor 124 to a first terminal of the coil 82a. The second terminal of coil 82a is connected to the power line 96. A capacitor 126 is connected in parallel with the coil 82a.

The armature 82b is connected to the ground line 98. The normally open contact of armature 82b is connected through a resistor 132 to a first terminal of the coil 84a. The second terminal of coil 84a is connected to the power line 96. A capacitor 134 is connected in parallel with coil 84a. The armature 82c is connected to the normally open contact of armature 84b. The normally closed contact of armature 82c is connected through a resistor 136 to a first terminal of the coil 86a. The second terminal of coil 86a is connected to the power line 96. A capacitor 138 is connected in parallel with coil 86a.

The armature 84c is connected to the normally open contact of armature 86b. The normally closed contact of armature 84c is connected through a resistor 140 to a first terminal of the coil 88a. The second terminal of coil 88a is connected to the power line 96. A capacitor 142 is connected in parallel with the coil 88a.

The armature 86b is connected to the ground line 98.

The armature 88b is connected to the ground line 98. The normally closed contact of armature 88b is connected to the emitter terminal of transistor 106.

An operational description of the register 34 is now made in reference to FIG. 2. When the telephone set 24 receives an in-call command from the PABX 12, a signal is generated through line 70 to render transistor 106 conductive. If the make busy relay 76 is in the break condition and switch 100 is in the on state, the control relay 78 will make. The armatures 78b and 88c ensure that the make busy relay 76 can be in the make condition only when relays 78 and 88 are in the break condition.

When armature 78c closes to the make condition, power is applied across coil 80a to charge the capacitor 122. When capacitor 122 is charged the relay 80 is activated to the make condition.

When the armature 80b transitions to the normally open contact, power is applied across coil 82a. The make of relay 82 is delayed by the charging of capacitor 126 through resistor 124. This delay time is approximately 22 milliseconds. When the relay 82 enters the make condition the armature 82b transitions to the normally open contact to apply power across the coil 84a. When relay 82 enters the make condition the armature 82c transitions from the normally closed contact to the nonconnected normally open contact.

As power is applied across coil 84a there is a delay in the make of relay 84 due to the charging of capacitor 134 through resistor 132. This time delay is approximately 22 milliseconds. When relay 84 enters the make condition the armature 84b transitions to the normally open contact and armature 84c likewise transitions to the normally open contact.

When relay 82 is in the break condition and relay 84 is in the make condition, power is applied to coil 86a. The make of relay 86 is delayed by the charging of capacitor 138 through resistor 136. This time constant is approximately 26 milliseconds.

After the preset time delay the relay 86 enters the make condition, thereby transitioning armature 86b to the normally open contact. Thus, when relay 86 is in the make condition and relay 84 has transitioned to the break condition, power is applied to the relay 88. There is a time delay in the make of relay 88 and this is determined by the charging of capacitor 142 through resistor 140. This time delay is approximately 38 milliseconds. The make of relay 88 causes armatures 88b and 88c to transfer from the normally closed contacts.

Thus, when an in-call digital command is received at telephone 24 and the make busy relay is not in the make condition, a time sequence of operations is carried out to first activate the in-call key 56, followed by initiating a transfer command through key 58, followed by transmitting an auto-dial number by activation of key 60 and last by again activating the transfer key 58 to complete the telephone call transfer by disconnecting the telephone set 24. Should all of the lines 40 become full or one of the lines become available after all of the lines are full, there will be generated a pulse which is transmitted through the lines 118 and 120 to momentarily activate the MB relay 76 which in turn momentarily activates the relay of the MB key 62. These pulses serve to set and reset the make busy function of the telephone set 24. When the make busy function of set 24 is activated, a command is transmitted from set 24 to PABX 12 indicating that no calls are to be sent to set 24 until the make busy function is deactivated.

Figure 3:
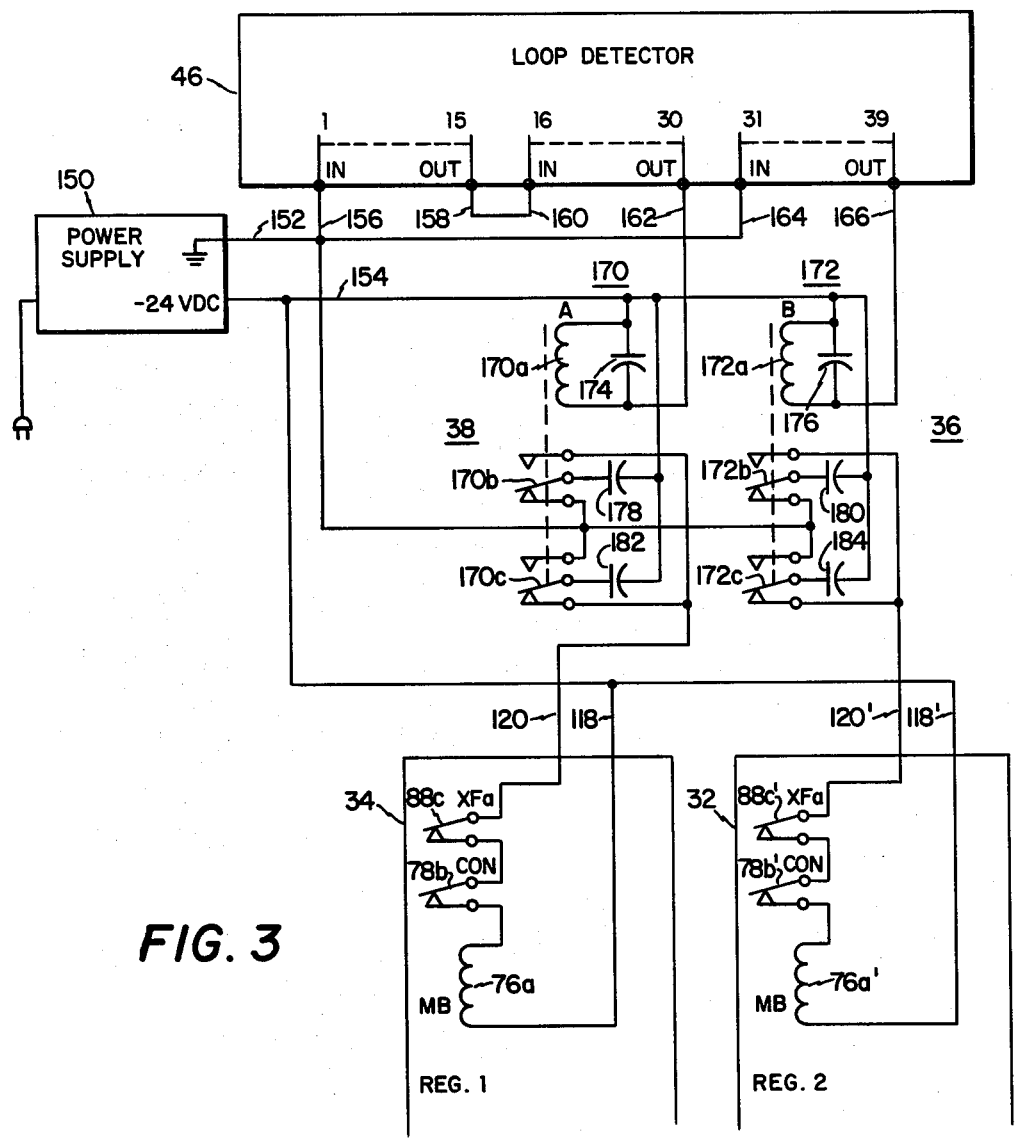
FIG. 3 is a schematic illustration of plural make busy circuits which are utilized in conjunction with the register shown in FIG. 2.

The make busy circuits 36 and 38 together with the loop detector 46 are illustrated in FIG. 3. A power supply 150 provides a ground through a line 152 and a minus 24 volts DC through a line 154.

The lines 40 passing through the loop detector 46 are divided into three groups. Group one comprises lines 1–15, group two comprises lines 16–30, group three comprises line 31–39. For each line there is a corresponding relay which is driven to the make condition when the line is in use. The ground line 152 is connected to an input terminal 156 of detector 46. Terminals 158 and 160 of detector 146 are connected together. Terminal 162 is an output of detector 146. Line 152 is further connected to an input terminal 164 of detector 46. Finally, terminal 166 is an output of detector 146.

The relays in detector 46 for lines 1–15 are connected in series between lines 156 and 158. The relays for lines 16–30 are connected in series between lines 160 and 162 such that a ground condition is applied to line 162 when all of the lines 1–30 are in use. Likewise, a ground condition is provided at terminal 166 when lines 31–39 are simultaneously in use because the relays for lines 31–39 are connected in series.

Make busy circuit 38 includes a relay 170 having a coil 170a and armatures 170b and 170c. The make busy circuit 36 includes a relay 172 having a coil 172a and armatures 172b and 172c.

A capacitor 174 is connected in parallel with the coil 170a. A capacitor 176 is connected in parallel with the coil 172a. A capacitor 178 is connected between line 154 and the armature 170b. A capacitor 180 is connected between line 154 and armature 172b. A capacitor 182 is connected between lines 154 and armature 170c.

A capacitor 184 is connected between line 154 and armature 172c.

The ground line 152 is connected to the normally closed contacts of armatures 170b and 172b. Ground line 152 is also connected to the normally open contacts of armatures 170c and 172c.

Line 118 from the register 34 is connected to the minus 24 volt DC power line 154 and the line 120 is connected to the normally open contact of armature 170b and the normally closed contact of armature 170c.

The structure for the register 32 is the same as that for the register 34 with the addition of a prime symbol for each reference numeral.

When all of the lines 1–30 of the telephone lines 40 are simultaneously in use there is generated a ground which is applied to a first terminal of the coil 170a which has its second terminal connected to the −24 volt DC line 154. This causes relay 170 to make and the operation of armature 170b and capacitor 170a causes a pulse to be transmitted through line 120. When one of the lines 1–30 of telephone lines 40 opens after all of the lines 40 have been in use, the ground applied to coil 170a is removed, thus permitting the relay 170 to break. This operation causes the armature 170c and capacitor 182 to apply a pulse to the line 120. Thus, a pulse is applied to line 120 whenever all of the telephone lines 40 in the first group are in use or when one of them becomes available after all were in use. This causes the setting and resetting of the make busy key 62 and associated circuit of the telephone set 24.

A similar action occurs with the lines 40 in the group 31–39 of the loop detector 46 for make busy circuit 46 and register 32.

The operation of the make busy relay circuit 38 and the function of the circuit is described as follows in reference to FIG. 2. If all of the lines 40 in one group, such as 1–30, become in use simultaneously, a pulse is applied to line 120 to activate the make busy switch in telephone set 24. This causes the generation of a make busy command signal which is transmitted through line 18 to the PABX 12 which prevents the transmission of any in-call signal to the telephone set 24. Thus, no attempt is made to connect an incoming call through a trunk line to the voice response computer 50 since all of the lines 40 are filled. When one of the lines 40 in a group becomes available, another pulse is generated by the make busy circuit 38 and this pulse is transmitted through line 120 to the register 34. This causes a subsequent activation of the function for the make busy key 62 which cancels the make busy condition previously transmitted through line 18, thereby permitting the receipt of an in-call command through line 18 from the computer PABX 12.

The make busy circuit 38 also serves to temporarily block the receipt of any in-call signal to the telephone set 24 for a period of approximately 50 milliseconds after the completion of the transfer of a call. This allows sufficient time for the computer PABX 12 to reset, during which time it does not send an in-call command to the telephone set 24.

A summary of the sequential operation of the circuit of the present invention is illustrated in FIG. 4 as a time sequence graph. Each X marks the closing (make) of a relay and each — marks the opening (break) of a relay. Upon receipt of an in-call command from the computer PABX 12 the control relay 78 is driven to a make condition. This is followed by a make for the start relay 80 and the answer relay 82. Next, the start relay is driven to the break condition. The transfer of the call is then initiated by the make of the transfer relay 84. The answer relay 82 is next driven to the break condition followed by a break for the control relay 78. In the next sequential step, the auto-dial relay 86 is driven to the make state to provide a number to transfer the call to the appropriate group of the lines 40. The next step is the break of the transfer relay 84. In the next step the transfer accomplish relay 88 is made to terminate the connection of the computer PABX to the telephone set 24. In the last sequential steps the auto-dial relay 86 is driven to the break state along with the transfer accomplish relay 88.

The make busy relay 76 is selectively activated depending upon the in-use condition of all of the lines in a group of the lines 40 or when one of the lines becomes available. The relay 76 further serves the function of delaying the back-in-service condition of the register immediately after the completion of a call in order to enable the computer PABX 12 to reset.

Although mechanical relays are shown for the illustrated embodiment of the present invention it is understood that electronic relays, electronic switches, and/or solid state devices can likewise be utilized to carry out the same function.

Although one embodiment of the invention has been illustrated in the accompanying Drawings and described in the Detailed Description, it will be understood that the invention is not limited to the embodiments disclosed, but is capable of numerous rearrangements, modifications and substitutions without departing from the scope of the invention.

We claim:

1. A method for routing a telephone call received from one of a group of trunk lines, which serves a private branch exchange (PBX), through a select one of a plurality of two-wire lines connected between said PBX and a user device, the PBX having an automatic call distribution subsystem which works in conjunction with a plurality of digital control telephone lines, the method comprising the steps of:
   passing a telephone call from one of the trunk lines through the PBX and a selected one of the digital control telephone lines to a telephone set,
   monitoring said two-wire lines to detect whether or not at least one of said two-wire lines is idle,
   passing a call transfer command from said telephone set to said PBX after receipt of said telephone call by said telephone set and provided at least one of said two-wire lines is idle as determined by said step of monitoring, and
   transferring said telephone call from said selected digital control telephone line to an available one of said two-wire lines in response to said call transfer command such that the telephone call is forwarded to said user device.

2. The method recited in claim 1 including the step of passing a busy condition signal from said telephone set to said PBX when said step of monitoring indicates that all of said two-wire lines are in use.

3. The method recited in claim 1 wherein the step of passing a call transfer command includes the step of generating an address signal at said telephone set and transmitting said address signal to said PBX.

4. A method for routing a telephone call received from one of a group of trunk lines, which serve a private branch exchange (PBX), through a select one of a plurality of two-wire lines connected to both a user device and the PBX, the PBX having an automatic call distribution subsystem which works in conjunction with a plurality of digital control telephone lines, the method comprising the steps of:

passing a telephone call from one of the trunk lines through the PBX and a selected one of the digital control telephone lines to a telephone set, said telephone set having an in-call relay, a transfer relay, an auto-dial relay and a make busy relay, transmitting from said telephone set an in-call signal to a register upon receipt of said telephone call from said PBX, monitoring said two-wire lines with said register to determine whether or not at least one of said two-wire lines is idle, activating said in-call relay of said telephone set with said register in response to said in-call signal when at least one of said two-wire lines is idle, and sequentially activating the transfer relay with said register followed by the auto-dial relay followed by a second activation of the transfer relay, thereby transferring said call from said telephone set through one of said two-wire lines to said user device.

5. The method recited in claim 4 including the step of activating the make busy relay of said telephone set with said register when all of said two-wire lines are in use.

6. Apparatus for routing a telephone call from one of a group of trunk lines through a private branch exchange (PBX) to a user device over a two-wire telephone line, the apparatus comprising:

a telephone set connected to said PBX via a digital control telephone line for receiving a telephone call from said PBX, said telephone set generating an in-call signal upon receiving the telephone call, and means responsive to said in-call signal for activating said telephone set to transfer said telephone call by operation of said PBX from said telephone set to the user device over said two-wire telephone line such that said telephone call is transferred from said digital control telephone line to said two-wire telephone line to free said telephone set for another telephone call.

7. Apparatus for routing a telephone call received from one of a group of trunk lines, which serve a private branch exchange (PBX), through a select one of a plurality of two-wire lines connected to both a user device and the PBX, the PBX having an automatic call distribution subsystem which works in conjunction with a plurality of digital control telephone lines, the apparatus comprising:

a telephone set connected to one of said digital control telephone lines for receiving a telephone call from said PBX through said automatic call distribution subsystem, said telephone set generating an in-call signal upon receiving the telephone call, means for monitoring said two-wire lines to determine whether or not at least one of said two-wire lines is idle, and means responsive to said means for monitoring and said in-call signal for activating said telephone set to transfer said telephone call, by operation of said PBX, from said telephone set to one of said two-wire lines which is idle, thereby connecting said telephone call, which is received from one of said trunk lines, to said user device.

8. The apparatus recited in claim 7 wherein said means for activating, in response to said means for monitoring, generates a pulse when all of said two-wire lines become in use and when one of said two-wire lines becomes available after all of said two-wire lines have been in use, said pulses serving to set and reset a make busy relay of said telephone set.

9. The apparatus recited in claim 7 wherein said means for activating comprises a plurality of sequentially activated relays connected to operate a set of function relays of said telephone set.

10. Apparatus for routing a telephone call received from one of a group of trunk lines, which serve a private branch exchange, through a select one of a plurality of two-wire lines connected to both a user device and the PBX, the PBX having an automatic call distribution subsystem which works in conjunction with a plurality of digital control telephone lines, the apparatus comprising:

a telephone set connected to one of said digital control telephone lines, said telephone set having an in-call circuit, a call transfer circuit, an auto-dial circuit and a make busy circuit, each of said telephone set circuits operating in conjunction with said PBX, the activation of said make busy circuit generating a make busy signal for blocking receipt of a call from said PBX to said telephone set, a loop detector for monitoring said two-wire lines to determine whether or not at least one of said lines is idle, and a register connected to receive an in-call signal from said telephone set and said make busy signal from said make busy circuit, said register including a respective relay for each of the circuits of said telephone set, each of said relays connected to activate the corresponding circuit of said telephone set, said relays, other than the one of said relays for said make busy circuit, sequentially activated in response to receipt of said in-call signal from said telephone set, said register operating said make busy circuit in response to said make busy signal.

11. The apparatus recited in claim 10 wherein said loop detector includes circuitry for monitoring selected groups of said two-wire lines.

12. The apparatus recited in claim 10 wherein said make busy circuit includes:

a relay which is activated by the output from said loop detector, and circuit means for generating a pulse for said make busy signal upon receipt of an output from said loop detector.

13. The apparatus recited in claim 10 wherein said register includes:

a start relay which is activated in response to said in-call signal and causes sequential activation of said in-call circuit relay, said transfer circuit relay, said auto-dial circuit relay and said transfer circuit relay, and circuit means for time delaying the activation of said in-call circuit relay, said transfer circuit relay and said auto-dial circuit relay.

* * * * *